(12) United States Patent
Roehm

(10) Patent No.: US 7,594,856 B2
(45) Date of Patent: Sep. 29, 2009

(54) OVERLOAD CLUTCH DEVICE, CLUTCH DISK, AND DRIVING TOOTHED WHEEL

(75) Inventor: Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 10/550,659

(22) PCT Filed: Sep. 9, 2004

(86) PCT No.: PCT/DE2004/002128

§ 371 (c)(1),
(2), (4) Date: Sep. 26, 2005

(87) PCT Pub. No.: WO2005/040621

PCT Pub. Date: May 6, 2005

(65) Prior Publication Data

US 2006/0217204 A1  Sep. 28, 2006

(30) Foreign Application Priority Data

Oct. 17, 2003  (DE) .................... 103 48 398

(51) Int. Cl.
*F16D 7/04* (2006.01)
(52) U.S. Cl. .................... 464/30; 464/37; 192/56.1

(58) Field of Classification Search .......... 464/30, 464/37, 77; 192/56.1
See application file for complete search history.

(56) References Cited

U.S. PATENT DOCUMENTS

| 295,595 | A | * | 3/1884 | Tilton ............. 464/37 |
| 2,757,523 | A | | 8/1956 | Schmid |
| 5,183,140 | A | * | 2/1993 | Nicoll ............. 192/56.1 |
| 2002/0007996 | A1 | | 1/2002 | Larson et al. |

FOREIGN PATENT DOCUMENTS

WO  97/48915  12/1997

OTHER PUBLICATIONS

"Lexikon Der Elektrowerkzeuge", 5th Edition, 2001, Published by Robert Bosch GMBH, p. 232, (Admitted Prior Art).

* cited by examiner

*Primary Examiner*—Aaron M Dunwoody
(74) *Attorney, Agent, or Firm*—Michael J. Striker

(57) ABSTRACT

An overload clutch device for a power tool includes an electric motor used to rotatably drive an insertion tool (12), the overload clutch device being provided with a first and second corresponding clutch means (22, 26). The first clutch means (26) is fixed to an output shaft (20) in a force-dependent manner.

12 Claims, 2 Drawing Sheets

OVERLOAD CLUTCH DEVICE, CLUTCH DISK, AND DRIVING TOOTHED WHEEL

CROSS-REFERENCE

The invention described and claimed hereinbelow is also described in PCT/DE 2004/002128, filed on Sep. 9, 2004 and DE 103 48 398.5, filed Oct. 17, 2003. This German Patent Application provides the basis for a claim of priority of invention under 35 U.S.C. 119 (a)-(d).

BACKGROUND OF THE INVENTION

The present invention is based on an overload clutch device, a clutch disk and a drive gear.

In the case of power tools with insertion tools that cut in a defined manner, e.g., portable circular saws, an abrupt increase in working force can occur easily during operation. It is known to use overload clutch devices for a case such as this, the overload clutch device interrupting a flux of force from the electric motor to the drive section when a preset torque level is reached. One example of an overload clutch device of this type is a safety clutch described, e.g., in the "Lexikon der Elektrowerkzeuge", 5$^{th}$ edition, 2001, published by Robert Bosch GmbH, Stuttgart, page 232. In that case, a drive gear and clutch rollers with springs interact in the manner of corresponding clutch means. The drive gear, which drives a spindle, for example, radially encloses a drive shaft. Pocket bearings are machined in the inner circumference of the drive gear, the pocket bearings being separated by catches and in which the clutch rollers roll. The clutch rollers are connected with the drive shaft via clutch springs that extend into grooves in the drive shaft. The drive shaft rotates the drive gear by driving action via the clutch rollers. If the spindle jams, the drive gear and clutch rollers are pressed into the grooves against the spring force while the drive shaft continues to rotate. If rotation continues, the clutch rollers can engage in the next pocket bearing and the drive gear will be driven again or, if the spindle is still jammed, the clutch rollers will disengage again.

SUMMARY OF THE INVENTION

The present invention is based on an overload clutch device for a power tool with an electric motor used to rotatably drive an insertion tool, including two corresponding clutch means.

According to the invention, the first coupling means is fixed to an output shaft in a force-dependent manner. As a result of the force-dependent fixing, if the working force and/or torque level abruptly exceed a permissible value during operation, the stiction that fixes the clutch means to the output shaft changes to kinetic friction and the output shaft can rotate relative to the clutch means. The geometric design of the clutch means allows it to be operated with low wear.

The torque level that, when exceeded, triggers the overload clutch device can be set specifically via the geometry and material properties of the clutch means. The clutch force is independent of the operator, thereby preventing the clutch force from being accidentally set incorrectly. Spikes in force that can result, e.g., from cutting forces, can be reliably withheld from the gearbox and the operator via the clutch means.

If the first clutch means is formed by a clutch disk fixed to the output shaft using a radial interference fit, the torque level that, when exceeded, triggers the overload clutch device, can be set specifically via the geometry and material properties of the clutch disk and the output shaft. The radial interference fit can be utilized by shaping the clutch disk accordingly to specifically transition from a non-positive connection to slip on the output shaft depending on a specifiable torque level.

If the second clutch means is a drive gear located on the output shaft, the two clutch means can be operatively interconnected.

If the drive gear engages via a driving feature in the first clutch means, if jamming or overload occurs, the drive gear can expand it, so that the first clutch means can rotate relative to the output shaft. The drive gear can drive the preferred clutch disk with a rotary motion if a jam does not exist.

If the insertion tool is jammed or if the output shaft is at a standstill, the overload clutch device is triggered and the output shaft can rotate relative to the clutch disk. The working mechanism can be implemented in a very easy, uncomplicated manner. If the driving feature has a permissible level of backlash in an opening of the drive gear, a torque level, above which the interference fit can be overcome, is determined only via the geometry and material properties of the clutch disk and the output shaft.

If, when the output shaft is jammed and the second clutch means rotate, the first clutch means are movable in the circumferential direction on the output shaft, and a flux of force from the electric motor to the drive can be reliably interrupted.

If the second clutch means is fixed to the output shaft with a clearance fit, operating noise can be reduced via axial and radial backlash of the clutch means, since the clutch means is situated axially and radially loosely on the output shaft and operator comfort is increased accordingly. Simultaneously, the preferred clutch disk enables axial fixing and backlash-limitation of the preferred drive gear on the output shaft.

If the first clutch means is designed as a snap-in disk, an overload clutch device for power tools—which were previously designed without clutches—can be designed preferably without a clutch but with spindle locking, at practically no additional cost. As an option, power tools of this type can also be retrofitted.

A clutch means is furthermore proposed that is designed as an annular segment with an opening. The result is a particularly low-wear design. The C-shaped cross section of a clutch disk designed as clutch means has less wear than an annular interference fit. It is favorable to provide a sufficient radial width of the annular segment, which is preferably greater than the thickness of the clutch disk in the axial direction. The range of force and/or the torque level at which the clutch disk changes from stiction to kinetic friction is relatively narrowly limited and is therefore easy to set. The driving feature of the drive gear can engage in the opening to establish an operative connection between the drive gear and clutch disk.

If the opening does not exceed 25% of the circumference, reliable power transmission can be achieved.

If an snap-in opening is provided on the outer circumference, the clutch means can be used as a snap-in disk for spindle locking. The functionality of a snap-in disk can be combined with a clutch functionality in a space-saving manner.

Furthermore, a clutch means can be proposed, in the case of which a driving feature is provided that projects outwardly from an end face. It can engage in an opening in the first clutch means and transfer torque. Depending on the torque level, a near-interference fit of the first clutch means can be triggered via the driving feature, so that the first clutch means can slip on the output shaft. The clutch means is preferably designed as a gear.

Particularly preferably, the power tool with an overload clutch device is a portable circular saw, in particular, a wall chaser, a grub saw, and/or an angle grinder. The present invention is particularly suited for use with power tools that have at least one speed. The present invention can be used particularly favorably in power tools that have a spindle lock for tool replacement.

BRIEF DESCRIPTION OF THE DRAWINGS

Further advantages result from the description of the drawing, below. An exemplary embodiment of the present invention is shown in the drawing. The drawing, the description and the claims contain numerous features in combination. One skilled in the art will also advantageously consider the features individually and combine them to form further reasonable combinations.

DETAILED DESCRIPTION OF THE EXEMPLARY EMBODIMENT

Figure 1:
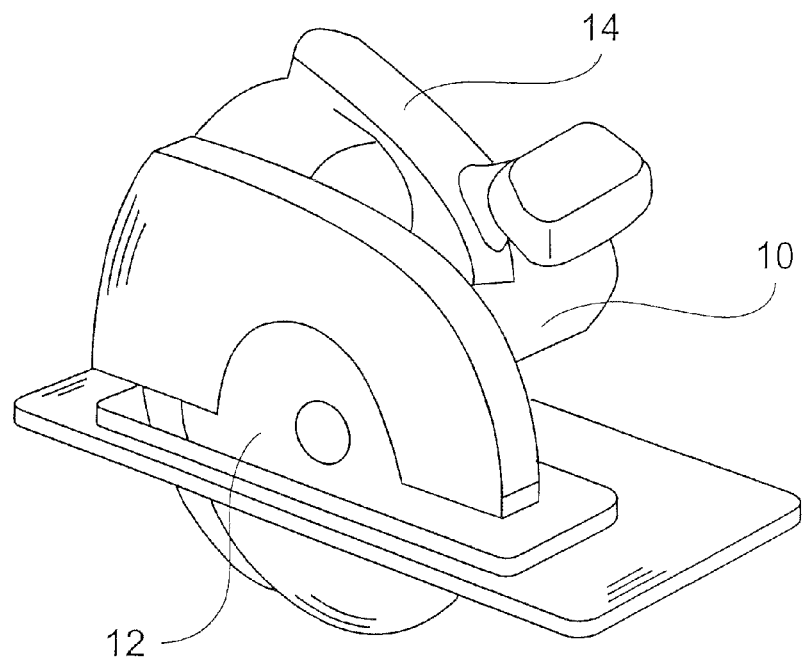
FIG. 1 Shows a preferred power tool in the form of a portable circular saw.

Identical or corresponding parts are labelled with the same reference numerals in the figures.

Figure 3:
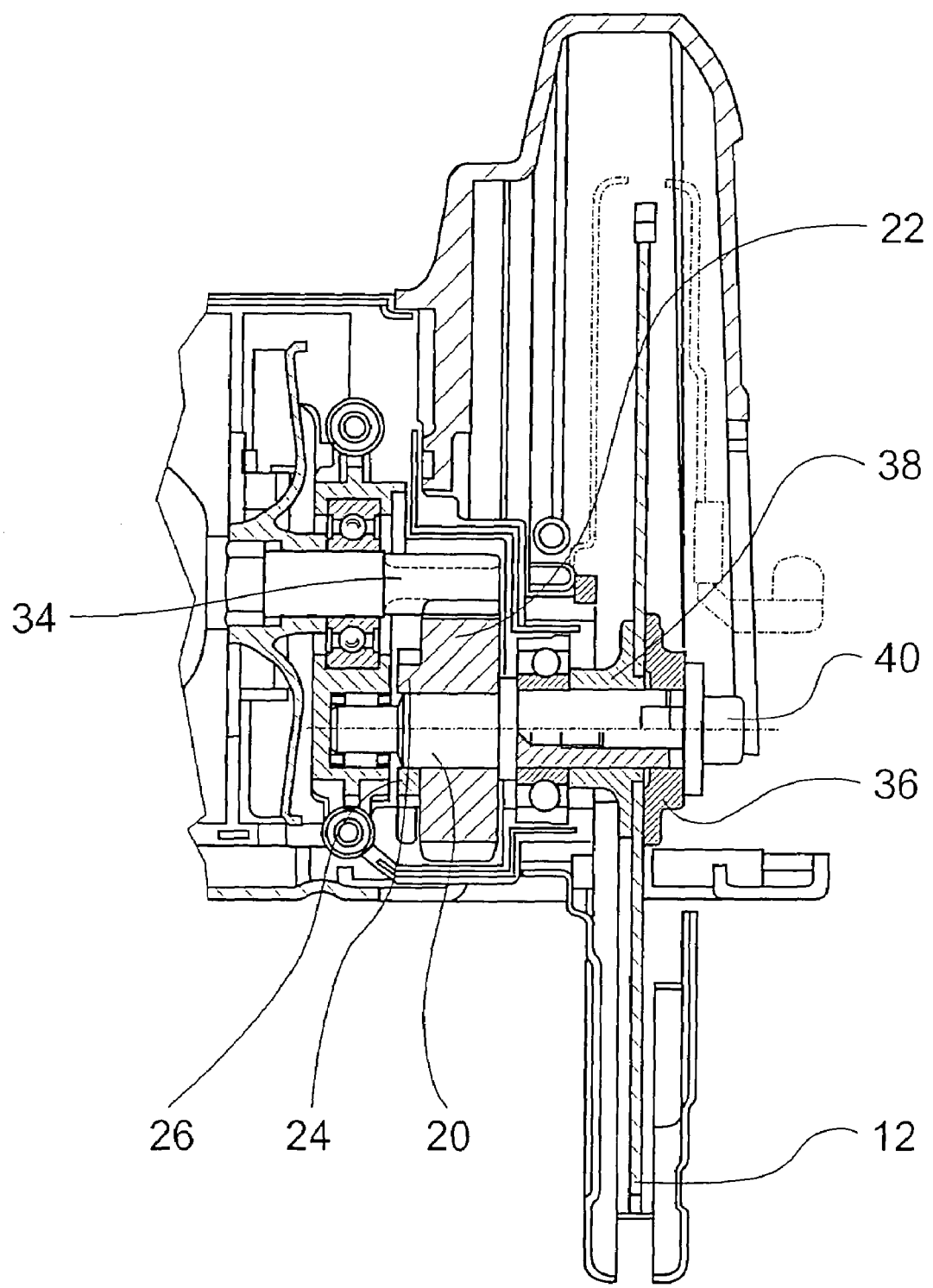
FIG. 3 Shows a section through a transmission space in a portable circular saw.

FIG. 1 shows a preferred power tool designed as a portable circular saw with an overload clutch device. An electric motor is located in a housing 10, the electric motor rotatably driving a saw blade as insertion tool 12. The power tool is held by a handle 14. The flux of force from the electric motor to the drive section is directed via a means 22 for transmitting the motor motion to a clutch means 26 fixed to an output shaft 20 in a force-dependent manner (FIG. 3).

Figure 2:
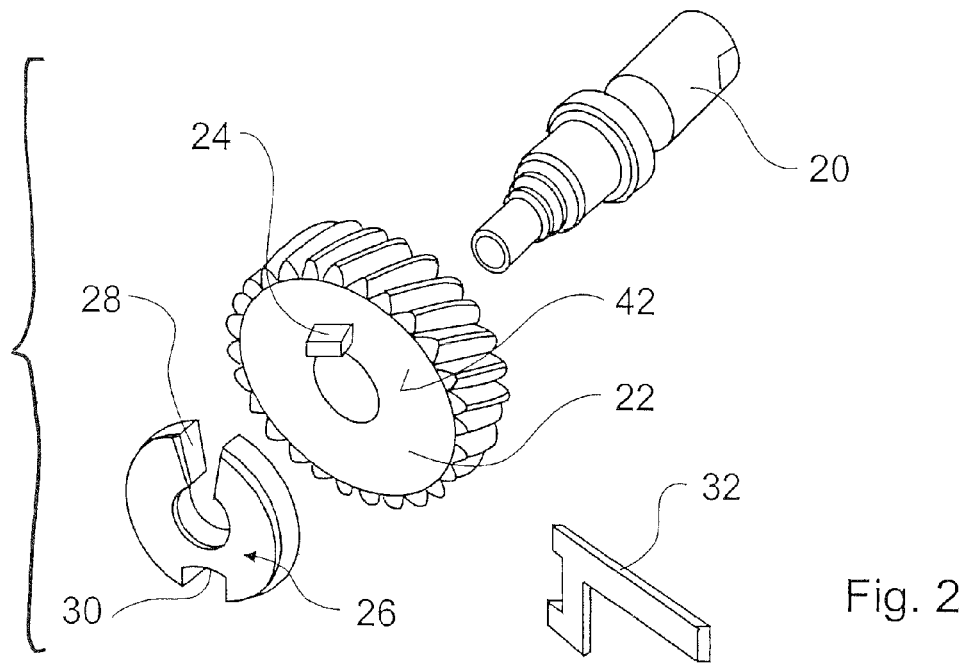
FIG. 2 Shows a spacial representation of transmission components.

FIG. 2 shows a spacial representation of transmission components with a first clutch means 26 in the form of a clutch disk and second clutch means 22 in the form of a drive gear. Clutch disk 26 is fixed to an output shaft 20 via a radial interference fit. Drive gear 22 located on output shaft 20 is operatively connected with clutch disk 26. Drive gear 22 is fixed on output shaft 20 with a clearance fit, i.e., relatively loosely, and is therefore movable radially and axially on output shaft 20, at least with limitations. Clutch disk 26 secures drive gear 22 in the axial direction.

Clutch disk 26 is designed as a C-shaped annular segment with an opening 28. Opening 28 secures drive gear 22 in the radial direction. Drive gear 22 engages via a driving feature 24 in opening 28 of clutch disk 26. Due to the C-shaped configuration of clutch disk 26, if output shaft 20 jams and drive gear 22 rotates, driving feature 24 of drive gear 22 can elastically expand clutch disk 26. Clutch disk 26 can then slide on rotating output shaft 20.

Clutch disk 26 is designed as a snap-in disk and has, on its outer circumference, at least one snap-in opening 30, into which, e.g., a pawl 32 can be manually inserted, e.g., to lock a spindle when replacing the tool. As an alternative, snap-in opening 30 can also be opening 28 if driving feature 24 fills opening 28 such that pawl 32 can be inserted.

FIG. 3 shows a section through a transmission space in a preferred portable circular saw. A mechanical train is formed by an armature with integral pinion 34 that drives drive gear 22 designed as a spur gear, drive gear 22 being mounted with clearance fit on an output shaft 20. A driving feature 24 of drive gear 22 extend into an opening 28 of a clutch disk 26 that is fixed on output shaft 20 via interference fit. An insertion tool 12 is fixed on output shaft 20 with a screw 40, e.g., via flange 36, 38.

Clutch disk 26 has a snap-in opening 30 on its outer circumference and an opening 28 in the body into which a pawl 32 can engage so that the saw blade can be replaced.

The "fit" of the interference fit between clutch disk 26 and output shaft 20 is designed such that normal working torques that occur during sawing can be transmitted over an entire characteristic curve of a motor and a stalled-motor torque level.

If working forces occur that exceed this torque range, e.g., when a hard object is accidentally sawed or when kick-back occurs, clutch disk 26 is bent upward slightly elastically via driving feature 24 that extends into opening 28 of clutch disk 26. The interference fit of clutch disk 26 on output shaft 20 is reduced as a result and clutch disk 26 is allowed to slip on output shaft 20. When the working forces drop back into the normal torque range, the interference fit engages again.

Driving feature 24 preferably has a permissible amount of backlash in opening 28, so that the interference fit of clutch disk 26 on output shaft 20 is defined only by the dimensions and material properties of clutch disk 26 and output shaft 20.

REFERENCE NUMERALS

10 Housing
12 Insertion tool
14 Handle
20 Output shaft
22 Drive gear
24 Driving feature
26 Clutch disk
28 Opening
30 Snap-in opening
32 Pawl
34 Pinion
36 Flange
38 Flange
40 Screw
42 End face

What is claimed is:

1. An overload clutch device for a power tool with an electric motor used to rotatably drive an insertion tool (12), the overload clutch device comprising first and second corresponding clutch means (22, 26), wherein the first clutch means (26) is fixed to an output shaft (20) in a force-dependent manner and is configured as a snap-in disk, wherein said second clutch means (22) has a driving feature (24) which Drolect outwardly from an end face of said second clutch means (22) and engages in an opening of said first clutch means (26) to transfer a torque, and wherein said driving feature (24) is configured so that elastically expands said first clutch means (26) in an event of a jamming of said output shaft (20).

2. The overload clutch device as recited in claim 1, wherein the first clutch means (26) is formed by a clutch disk fixed to the output shaft (20) via a radial interference fit.

3. The overload clutch device as recited in claim 1, wherein the second clutch means (22) is formed by a drive gear located on the output shaft (20).

4. The overload clutch device as recited in claim 3, wherein the drive gear (22) engages with the first clutch means (26) via a driving feature (24).

5. The overload clutch device as recited in claim 1, when the output shaft (20) is jammed and the second clutch means (22) is rotating, the first clutch means (26) is movable on the output shaft (20) in the circumferential direction.

6. The overload clutch device as recited in claim 1, wherein the second clutch means (22) is fixed to the output shaft (20) with a clearance fit.

7. Clutch means for an overload clutch device as recited in claim 1, said clutch means constructed as a snap-in disk, wherein a cross-section is configured as an annular segment with an opening (28).

8. The overload clutch device as recited in claim 1, said clutch mean snap-in disk has a cross-section configured as an annular segment with an opening (28), wherein the opening (28) does not exceed 25% of the circumference.

9. The overload clutch device as recited in claim 1, wherein at least one snap-in opening (30) is provided on the circumference.

10. The overload clutch device as recited in claim 1, wherein a driving feature (24) projects outwardly from an end face (42).

11. The overload clutch device as recited in claim 9, characterized by a body configured as a gear.

12. A power tool with an overload clutch device as recited in claim 1, said overload clutch device comprising an electric motor used to rotatably drive an insertion tool (12), the overload clutch device being provided with first and second corresponding clutch means (22, 26), wherein the first clutch means (26) is fixed to an output shaft (20) in a force-dependent manner and is designed as a snap-in disk.

* * * * *